US007219691B2

(12) United States Patent
Gethmann et al.

(10) Patent No.: US 7,219,691 B2
(45) Date of Patent: May 22, 2007

(54) CONTROL VALVE POSITIONER MOUNTING SYSTEM

(75) Inventors: Douglas P. Gethmann, Gladbrook, IA (US); Barry L. Gaarder, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 437 days.

(21) Appl. No.: 10/770,915

(22) Filed: Feb. 3, 2004

(65) Prior Publication Data

US 2004/0154466 A1 Aug. 12, 2004

Related U.S. Application Data

(60) Provisional application No. 60/445,752, filed on Feb. 7, 2003.

(51) Int. Cl.
*F16K 37/00* (2006.01)

(52) U.S. Cl. ...................... 137/554; 91/363 R; 91/365; 251/61.4

(58) Field of Classification Search ................ 137/554; 91/363 R, 365; 251/61.4
See application file for complete search history.

(56) References Cited

U.S. PATENT DOCUMENTS 4,340,086 A 7/1982 Hemm et al.
5,433,245 A * 7/1995 Prather et al. .............. 137/554
5,884,894 A * 3/1999 Smith .......................... 251/28
5,906,222 A 5/1999 Faulstich
6,152,172 A 11/2000 Christianson et al.
6,276,385 B1 * 8/2001 Gassman ....................... 137/1
6,321,781 B1 11/2001 Kurth
6,536,469 B2 * 3/2003 Dilger et al. ............... 137/554
6,752,171 B1 * 6/2004 Kemmler et al. ........... 137/552

FOREIGN PATENT DOCUMENTS

DE 44 38 293 5/1996
DE 197 06 106 8/1998
GB 2 298 519 9/1996
WO WO 01/42693 6/2001
WO WO 01/75344 10/2001

OTHER PUBLICATIONS

Operation & Maintenance Instruction Manual, www.smar.com, "*smar—FY301, Smart Valve Positioner*," Version 2, May 2004.
International Preliminary Report on Patentability for International Patent Application No. PCT/US2004/003529 by the International Bureau of WIPO dated Oct. 21, 2005 (7 pages).
International Search Report, International Application No. PCT/US2004/003529, filed May 2, 2004. Report dated Jul. 2, 2004.

* cited by examiner

*Primary Examiner*—A. Michael Chambers
(74) *Attorney, Agent, or Firm*—Marshall, Gerstein & Borun LLP

(57) ABSTRACT

A positioner for a control valve assembly is disclosed wherein the positioner is mounted internally to thus protect the positioner from damage stemming from environmental, impact, or other outside influences. Accordingly, not only can the position of the valve be accurately measured, but the sensing hardware is less subjected to damage or other drawbacks associated with exposure.

20 Claims, 5 Drawing Sheets

56
38
74
70
64
72
66
71
58

CONTROL VALVE POSITIONER MOUNTING SYSTEM

CROSS-REFERENCE TO RELATED APPLICATION

This application is a non-provisional application claiming the priority benefits under 35 U.S.C. §119(e) of U.S. provisional patent application Ser. No. 60/445,752, filed on Feb. 7, 2003.

FIELD OF THE DISCLOSURE

The disclosure generally relates to valves and, more particularly, relates to positioners used in monitoring the position of a moving component of a valve or valve actuator.

BACKGROUND OF THE DISCLOSURE

Process control valves are used in myriad industrial applications for controlling the flow of a fluid. For example, in chemical processing plants or oil refineries, control valves are used to manipulate a flowing fluid to compensate for increases or decreases in demand, or other load disturbances, and thus keep the regulated flow as close as possible to a desired set point.

The control valve is typically provided as part of a control valve assembly having a control valve, a control valve actuator, and a positioner. The control valve includes an inlet and an outlet, with a movable metering device therebetween. By adjusting the position of the metering device, the flow through the valve is adjusted. The control valve actuator typically includes a stem connected to the metering device and provides the necessary motive force for moving the metering device. The positioner provides a closed loop feedback system in that it monitors the position of the metering device, or more commonly the position of the actuator stem, and then compares that position to a desired set point. If a deviation between the two is detected which will result in an undesirable flow through the valve, the positioner generates a signal to the actuator to adjust the position of the metering device accordingly.

Such control valve assemblies can be provided in a variety of forms. In one common arrangement the control valve is referred to as a sliding stem valve. In such a valve, a sliding plug or piston is moved within a cage positioned between an inlet and outlet of the valve. Depending on the position of the plug, the cross-sectional area of opening between the inlet and outlet is adjusted, thus allowing more or less fluid to traverse through the valve. The actuator for such a control valve can also be provided in a variety of forms, but commonly has a movable stem directly coupled to a valve stem extending from the valve plug, and employs air pressure, or other fluid pressure, within a diaphragm casing of the actuator to thus cause the actuator stem to move.

The positioner of such a system is typically mounted on the outside of the actuator, and includes a sensor therein adapted to receive a signal from a transmitter mounted on the sliding stem of the actuator. However, by mounting the receiver on the outside of the housing, certain drawbacks are encountered. For example, pinch points are created within the power and signal wiring connected to the transmitter which can result in malfunctions or erroneous readings. In addition, the receiver is subjected to physical damage in that it is exposed to the elements and the working environments of the facility in which the valve is installed. Misalignment can occur in that the receiver is often mounted onto the housing using relatively simple brackets or the like, with such misalignment also contributing to inaccurate readings. Accordingly, periodic adjustment and/or recalibration is necessary, thus contributing to higher maintenance costs.

A need therefore exists for an improved control valve assembly having a positioner less susceptible to such problems.

Figure 1:
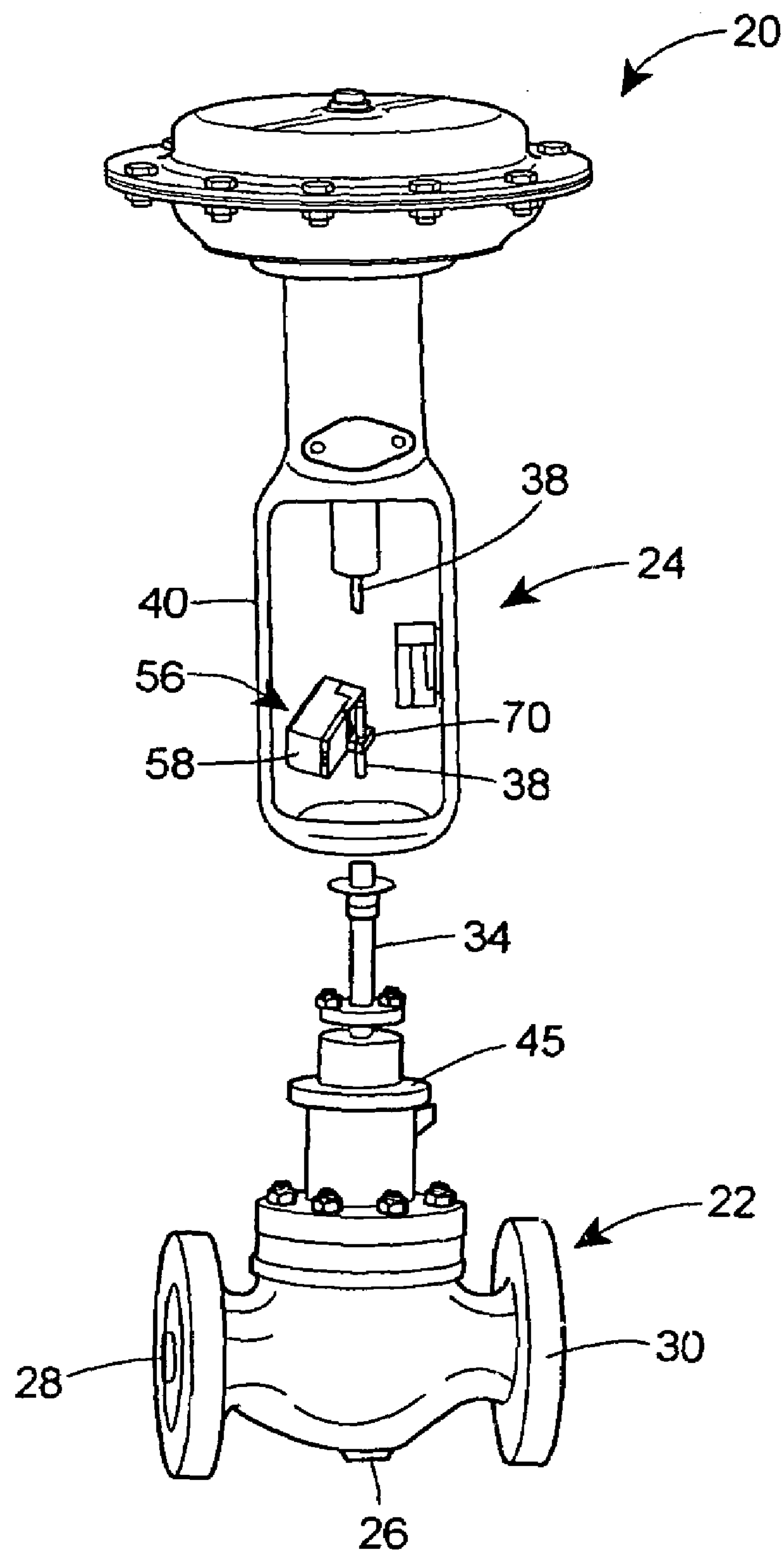
FIG. 1 is an exploded view of a sliding stem control valve assembly constructed in accordance with the teachings of the disclosure.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the invention.

DETAILED DESCRIPTION OF THE DISCLOSURE

Referring now to the drawings and with specific reference to FIG. 1, a control valve assembly constructed in accordance with the teachings of the disclosure is generally referred to by reference numeral 20. As shown therein, the control valve assembly 20 includes a control valve 22 to which a control valve actuator 24 is attached. At the outset, it is important to note that while the control valve assembly 20 described herein will be referred to as a sliding stem type of control valve, the teachings of the disclosure can be used in conjunction with other types of control valves, including but not limited to, rotary valves, butterfly valves, and the like.

Figure 2:
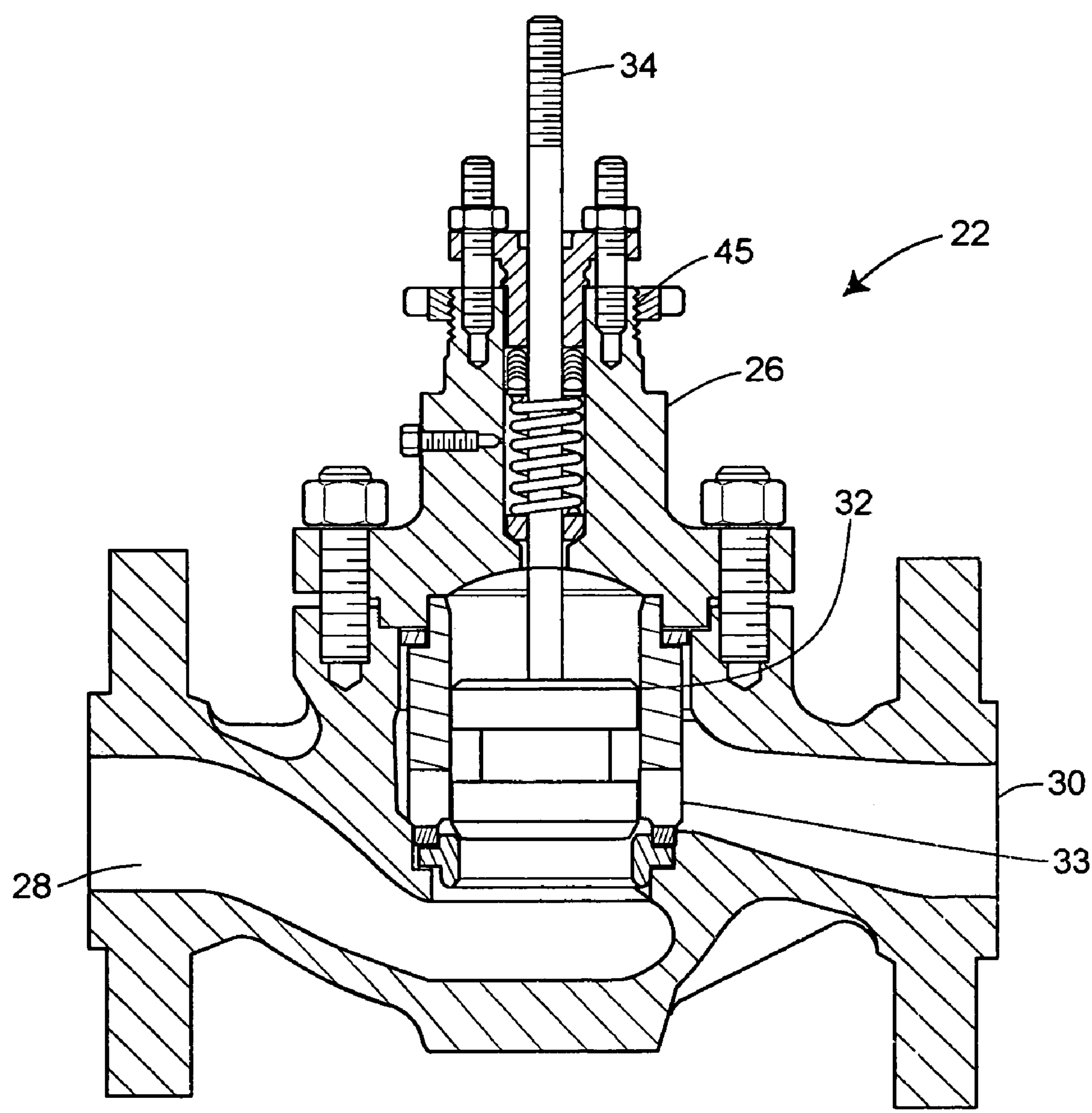
FIG. 2 is a sectional view of the sliding stem control valve.

Referring now to FIG. 2, the control valve 22 is shown in further detail to include a housing 26 having an inlet 28 and an outlet 30. While not shown, it is to be understood that the valve 22 is adapted to allow fluid to flow from the inlet 28 to the outlet 30, and that by adjusting the position of a metering device or plug 32 slidably disposed within a cage 33 positioned therebetween, the volume and rate at which the fluid flows therethrough can be adjusted as well. The position of the plug 32 is adjusted by adjusting the position of a valve stem 34 connected to the plug 32. More specifically, by adjusting the position of the stem 34, it can be seen that the position of the plug 32 relative to the inlet 28 and outlet 30 is also adjusted.

Figure 3:
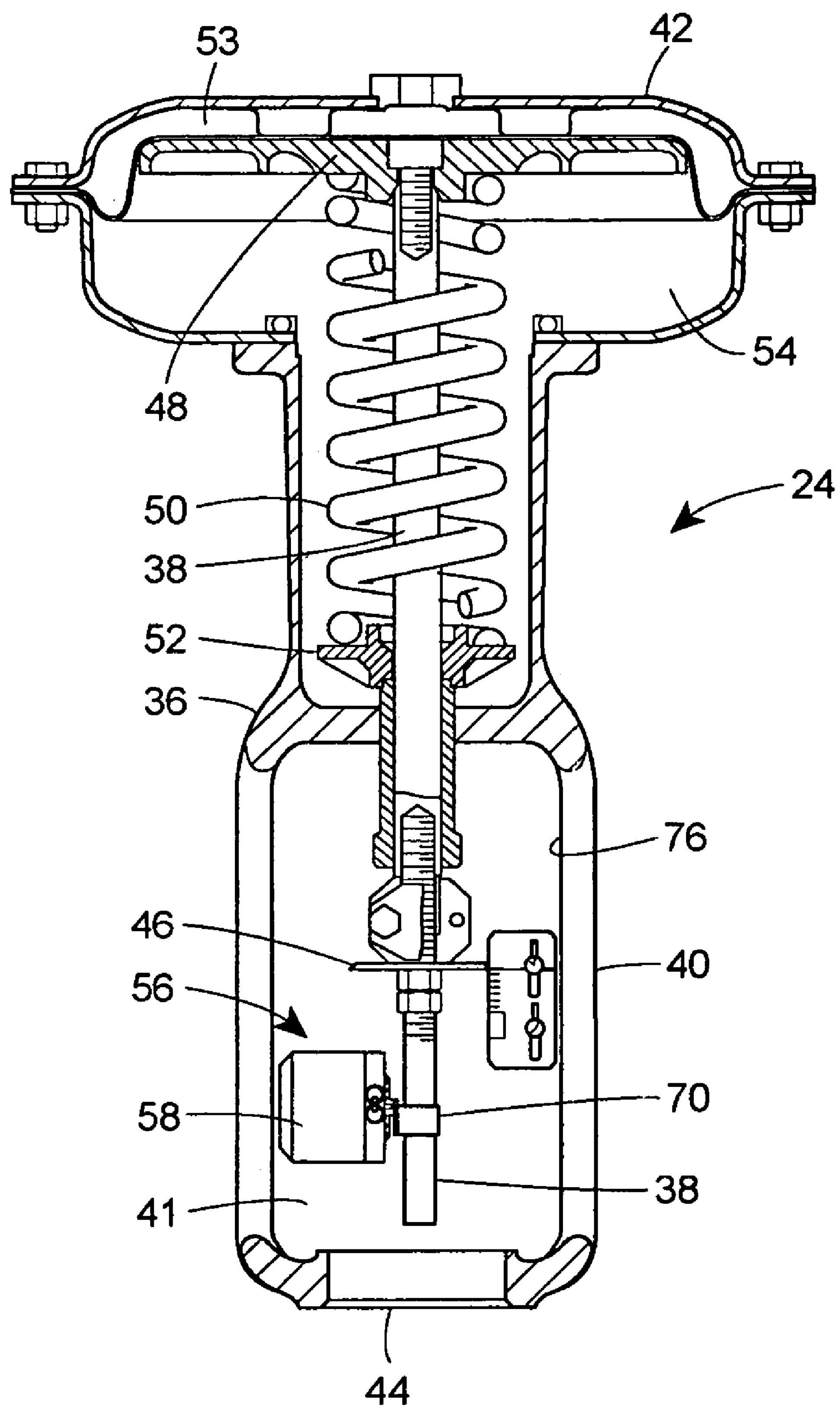
FIG. 3 is a sectional view of the valve actuator.

In order to so adjust the position of the stem 34 and thus the position of the plug 32, the actuator 24 is provided. As shown best in FIG. 3, the actuator 24 includes a housing 36 in which an actuator stem 38 is adapted to reciprocate. More specifically, in the depicted embodiment, the housing 36 includes a yoke 40 at a base thereof, and a diaphragm casing 42 at a top thereof. The yoke 40 defines a substantially cylindrical enclosure 41 including a bottom opening 44 adapted to mount to the valve 22 at a shoulder 45, as shown best in FIG. 1. Since the actuator stem 38 and valve stem 34 are connected by a coupling 46, the bottom opening 44 enables the stems 34, 38 to move therethrough.

Movement of the actuator stem 38 in such an actuator is controlled by spring and fluid pressure. As shown best in FIG. 3, the actuator stem 38 is connected to a diaphragm plate 48 positioned within the diaphragm casing 42. A coil spring 50 is then positioned around the actuator stem 38 and biases the diaphragm plate 48 upwardly by acting on both the plate 48 and a spring seat 52. The spring 50 therefore biases the diaphragm plate 48, actuator stem 38, valve stem 34, and valve plug 32 upwardly, with such a position for the valve plug 32 being either an open or closed position for the valve 22. Accordingly, it can be seen the control valve 22 could be provided in the form or either a normally open or normally closed valve.

In order to move the plug 32, and thus adjust the position of the valve 22, fluid pressure is adjusted in the diaphragm casing 42. More specifically, it will be noted that the diaphragm plate 48 divides the diaphragm casing 42 into upper and lower chambers 53 and 54, respectively. By adjusting the fluid pressure, typically air pressure, in the lower chamber 54 to be higher than that within the upper chamber 53, the diaphragm plate 48 is caused to move upwardly, thus moving the plug 32 upwardly. Conversely, by adjusting the fluid pressure in the upper chamber 53 to be higher than that in the lower chamber 54, the diaphragm plate 48 and plug 32 are moved downwardly. Of course, one of ordinary skill in the art will readily appreciate that the force generated by such a pressure differential must be great enough to overcome the biasing force of the spring 50 as well.

It is important to understand that the actuator 24 depicted is of but one type of actuator adapted to adjust the position of the valve stem and plug of the control valve 22. Other forms of actuators are possible, and included within the scope of the present application.

Figure 4:
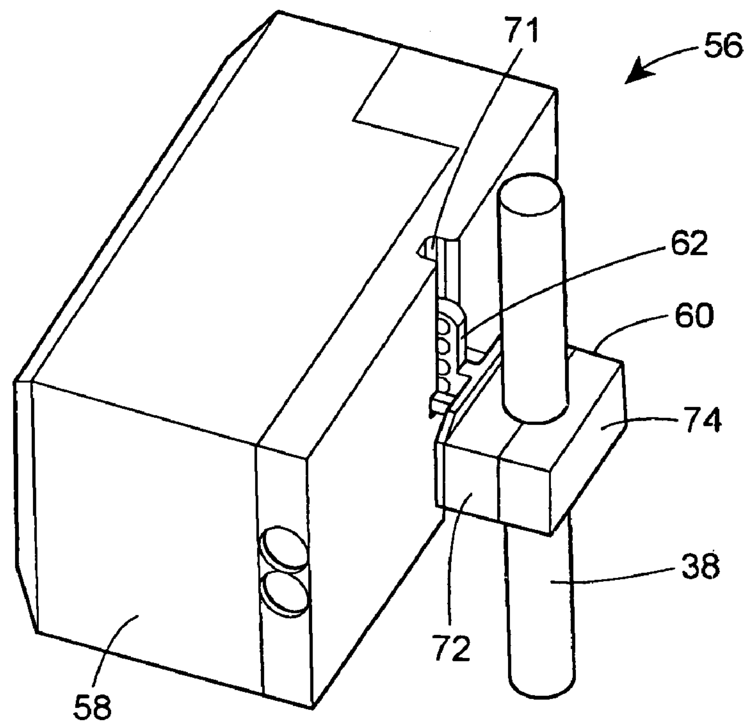
FIG. 4 is perspective view of a positioner constructed in accordance with the teachings of the disclosure.
Figure 5:
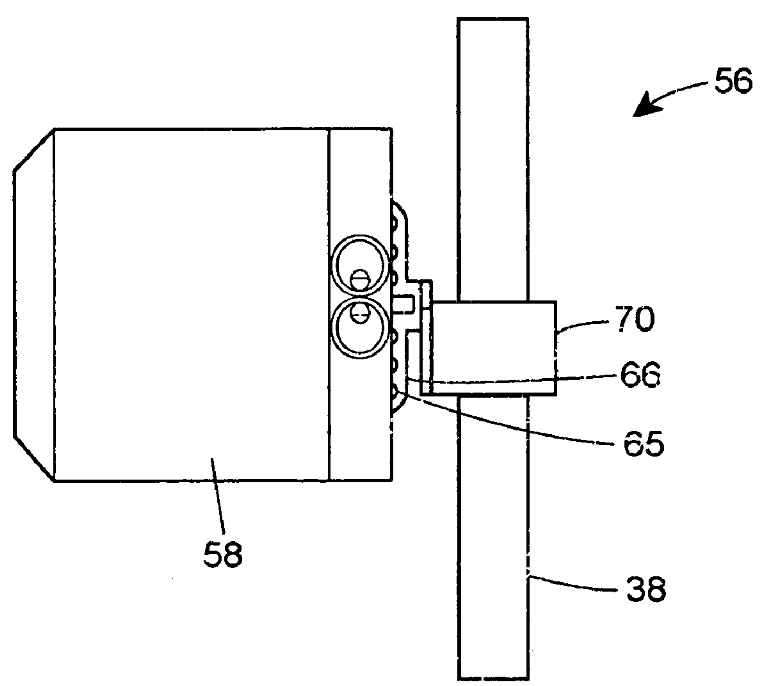
FIG. 5 is a side view of the positioner of FIG. 4.
Figure 6:
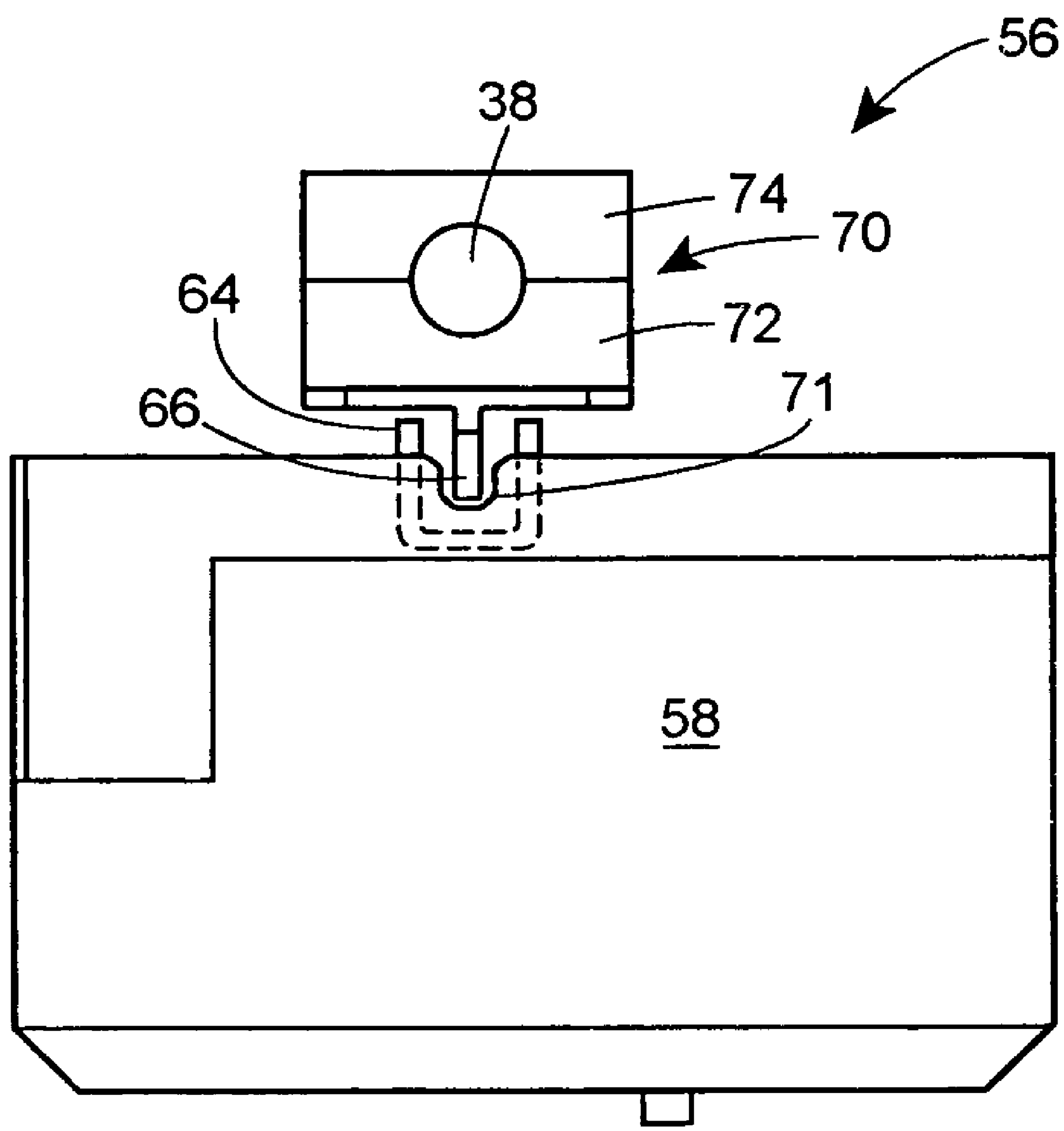
FIG. 6 is a top view of the positioner of FIG. 4.

Using structures such as that described above, it can seen that the position of the plug 32 can be adjusted to thus adjust the flow of fluid through the valve 22. However, in order to accurately position the plug 32, and thus accurately control the flow of fluid, a positioner 56 is provided. Referring now to FIGS. 4–6, it will be noted that the positioner includes a housing 58 and a sliding assembly 60. As will be described in further detail herein, the sliding assembly 60 includes a transmitter 62 adapted to generate a signal as the actuator stem 38 moves up and down. Moreover, the housing 58 includes a receiver 64 (FIG. 6) adapted to monitor the signal generated by the transmitter 62 and thus determine the relative position of the stem 38. In turn, the position of the plug 32 is determined and if the plug 32 is not positioned appropriately, a corresponding correction signal can be generated by the positioner 56. The correction signal is then used to adjust the pressure differential in the actuator 24 to position the plug 32 as desired. More specifically, as the positioner 56 may include a processor and memory (not shown), the received signal may be compared by the processor to a set point stored in the memory, to thus generate the correction signal. Alternatively, the positioner may communicate the received signal to a remote processor, by direct wiring, RF communication, or the like, with the remote processor then generating and transmitting the correction signal to the actuator 24.

While a number of different receiver and transmitter technologies can be employed, the depicted embodiment provides the transmitter 62 in the form of a magnet array, and the receiver 64 in the form or a Hall effect sensor. In alternative embodiments, the position sensor could be provided in any number of other forms including, but not limited to, giant magnetoresistive devices (GMR) and potentiometers. More specifically, the transmitter 62 includes a magnet holder 66 housing a plurality of magnets 68. The magnet holder 66 is mounted to a stem connector 70 fixedly attached to the actuator stem 38. As the transmitter 62 moves up and down with the actuator stem 38, the magnetic flux associated with the magnets 68 changes, and that change is perceived by the Hall effect sensor. The positioner housing 58 includes a groove 71 adapted to slidably receive the sliding assembly 60. The connector 70 may be provided in variety of forms, with the depicted embodiment including first and second halves 72, 74 mounted around the stem 38, and secured together using screws, bolts, or other fasteners (not shown).

As opposed to prior art positioners, the positioner 56 of the present disclosure is designed to be fully protected from outside influences and elements, thus making its reading more reliable. This is accomplished by placing the positioner 56 within the position housing 58 and mounting the housing 58 entirely within the yoke 40 of the actuator 24. The housing 58 of the positioner 56 is fixedly mounted onto an inside surface 76 of the yoke 40, such that it is stationary and protected, while the sliding assembly 60 and transmitter 62 slide up and down with the actuator stem 38. Accordingly, the positioner 56, including the receiver 64 and transmitter 62 is protected and is less likely to be damaged by impact, environmental factors, or the like.

From the forgoing, one of ordinary skill in the art will readily understand that through the teachings of the disclosure, a control valve assembly can be constructed having a valve positioner entirely incorporated within the housing of the valve actuator to thus minimize exposure thereof to environmental factors and damage.

What is claimed is:

1. A valve positioning system for use with a shiftable valve stem, the system comprising:

a housing mountable adjacent the valve stem and having a groove;

a receiver coupled to the housing and disposed adjacent the groove;

an assembly mountable to the valve stem, the assembly including a magnet array and a transmitter, the magnet array and the transmitter mountable to the valve stem, the magnet array extending into the groove to a location adjacent the receiver, the assembly arranged to cooperate with the receiver to generate a signal indicative of a position of the valve stem relative to the housing.

2. The system of claim 1, wherein the assembly includes a pair of halves mountable about the valve stem.

3. The system of claim 1, wherein the receiver comprises a U-shaped cross-section aligned with the groove.

4. The system of claim 1, wherein the transmitter is mounted adjacent the magnet array.

5. The system of claim 1, wherein the receiver is arranged to generate a correction signal.

6. The system of claim 1, wherein the receiver is adapted to monitor the signal to indicate changes in the position.

7. The system of claim 1, wherein the receiver comprises a Hall effect sensor.

8. The system of claim 1, wherein the receiver and the assembly comprise a giant magnetoresistive device.

9. The system of claim 1, wherein the receiver and the assembly comprise a potentiometer.

10. The system of claim 1, wherein the magnet array is mounted to a magnet holder.

11. A process control valve having a valve positioning system and comprising:

a shiftable valve stem operable to shift the position of a control element;

a housing mounted in a fixed position adjacent the shiftable valve stem, the housing including a receiver disposed adjacent a groove; and an assembly mounted to the valve stem and including a magnet and a transmitter, the magnet mounted in a position to extend into the groove to a non-contact location adjacent the receiver, the assembly arranged to cooperate with the receiver to generate a signal indicative of a position of the valve stem relative to the housing.

12. The system of claim 11, wherein the magnet comprise a magnet array mounted to a holder.

13. The system of claim 12, wherein the receiver comprises a U-shaped cross-section aligned with the groove, and the holder is secured to the valve stem.

14. The system of claim 13, wherein the magnet extends at least partially into the cross-section of the receiver.

15. The system of claim 11, wherein the receiver is arranged to generate a correction signal.

16. The system of claim 1, wherein the receiver is adapted to monitor the signal to indicate changes in the position.

17. The system of claim 11, wherein the receiver and the assembly comprise a giant magnetoresistive device, a Hall effect sensor, or a potentiometer.

18. A process control valve having a valve positioning system and comprising:

a shiftable valve stem disposed in a yoke and coupled to an actuator, the valve stem operable to shift a position of a control element;

a receiver mounted in a fixed position within the yoke and adjacent the valve stem, the receiver comprising a groove oriented along the valve stem; and a magnet coupled to a transmitter, the magnet and the transmitter mounted to the valve stem, the magnet mounted in a position to extend into the groove to a non-contact location adjacent the receiver, the magnet and the transmitter arranged to cooperate with the receiver to generate a signal indicative of a position of the valve stem relative to the fixed yoke.

19. The system of claim 18, wherein the magnet comprise a magnet array mounted to a holder, the magnet array extending at least partially into the cross-section of the receiver.

20. The system of claim 18, wherein the receiver is further arranged to generate a correction signal, and to communicate the correction signal to the actuator.

* * * * *

UNITED STATES PATENT AND TRADEMARK OFFICE

CERTIFICATE OF CORRECTION

PATENT NO. : 7,219,691 B2
APPLICATION NO. : 10/770915
DATED : May 22, 2007
INVENTOR(S) : Douglas P. Gethmann et al.

It is certified that error appears in the above-identified patent and that said Letters Patent is hereby corrected as shown below:

In the Specification:

At Column 3, line 16, "or" should be -- of --.

At Column 4, line 1, "or" should be -- of --.

In the Claims:

At Column 5, line 17, "comprise" should be -- comprises --.

At Column 6, line 19, "comprise" should be -- comprises --.

Signed and Sealed this

Seventh Day of October, 2008

JON W. DUDAS
*Director of the United States Patent and Trademark Office*